US008820941B2

(12) United States Patent
Yang et al.

(10) Patent No.: US 8,820,941 B2
(45) Date of Patent: Sep. 2, 2014

(54) PROJECTION APPARATUS AND LIGHT SOURCE ADJUSTING METHOD THEREOF

(75) Inventors: Chien-Yi Yang, Hsin-Chu (TW); Tzu-Tse Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 296 days.

(21) Appl. No.: 13/439,806

(22) Filed: Apr. 4, 2012

(65) Prior Publication Data
US 2013/0003027 A1 Jan. 3, 2013

(30) Foreign Application Priority Data
Jul. 1, 2011 (CN) .......................... 2011 1 0189225

(51) Int. Cl.
G03B 21/20 (2006.01)
H04N 5/74 (2006.01)
F21V 19/02 (2006.01)
G02B 26/08 (2006.01)
H04N 9/31 (2006.01)
G02B 7/10 (2006.01)
H04N 13/04 (2006.01)
G03B 21/00 (2006.01)
G02B 7/02 (2006.01)

(52) U.S. Cl.
CPC .......... *G03B 21/008* (2013.01); *G02B 26/0833* (2013.01); *H04N 9/315* (2013.01); *H04N 9/31* (2013.01); *G03B 21/2046* (2013.01); *G02B 7/10* (2013.01); *H04N 13/0427* (2013.01); *H04N 9/3155* (2013.01); *G02B 7/023* (2013.01); *G03B 21/2086* (2013.01); *G03B 21/2053* (2013.01); *H04N 9/3194* (2013.01)
USPC ............. 353/87; 348/771; 362/277; 362/285; 362/372

(58) Field of Classification Search
CPC .. G03B 21/008; G03B 21/2046; G03B 7/023; G03B 21/2053; G03B 21/14; H04N 9/3155; H04N 13/0427; H04N 2005/7458; H04N 9/3197; H04N 9/315; H04N 9/31; G02B 26/0833; G02B 7/10
USPC ............. 353/87, 101, 121; 348/771; 362/277, 362/285, 372
See application file for complete search history.

(56) References Cited

U.S. PATENT DOCUMENTS

| 6,592,228 | B1 * | 7/2003 | Kawashima et al. ......... 353/101 |
| 6,909,560 | B2 | 6/2005 | Lin et al. |
| 2003/0179435 | A1 * | 9/2003 | Tomiya ........................ 359/291 |

FOREIGN PATENT DOCUMENTS

| CN | 1808200 | 7/2006 |
| CN | 1811588 | 8/2006 |

(Continued)

OTHER PUBLICATIONS

"Office Action of China Counterpart Application", issued on May 6, 2014, pp. 1-10.

*Primary Examiner* — Georgia Y Epps
*Assistant Examiner* — Magda Cruz
(74) *Attorney, Agent, or Firm* — Jianq Chyun IP Office

(57) ABSTRACT

A projection apparatus including a digital micro mirror device (DMD), a light source, a lens, a photoelectric conversion device, a decision device and an adjustment module is provided. When the DMD is switched to a first operating state, the DMD reflects a light beam emitted by the light source to the lens. When the DMD is switched to a second operating state, the DMD reflects the light beam to the photoelectric conversion device. The photoelectric conversion device generates a signal value according to a light intensity of the light beam. The decision device compares the signal value with a predetermined value. When the signal value is smaller than the predetermined value, the decision device generates a driving signal value. The driving signal value is used for driving the adjustment module to sequentially adjust a position of the light source along a plurality of axes.

11 Claims, 6 Drawing Sheets

(56) References Cited

FOREIGN PATENT DOCUMENTS

| | | |
|---|---|---|
| CN | 1900815 | 1/2007 |
| CN | 101118719 | 2/2008 |
| CN | 101976015 | 2/2011 |
| CN | 101995742 | 3/2011 |
| JP | 2005077621 | 3/2005 |
| JP | 2009198539 | 9/2009 |
| TW | 579452 | 3/2004 |
| TW | 582494 | 4/2004 |
| TW | I267606 | 12/2006 |
| TW | 200702891 | 1/2007 |

\* cited by examiner

PROJECTION APPARATUS AND LIGHT SOURCE ADJUSTING METHOD THEREOF

CROSS-REFERENCE TO RELATED APPLICATION

This application claims the priority benefit of China application serial no. 201110189225.2, filed on Jul. 1, 2011. The entirety of the above-mentioned patent application is hereby incorporated by reference herein and made a part of this specification.

BACKGROUND OF THE INVENTION

1. Field of the Invention

The invention relates to an optical apparatus and a light source adjusting method thereof. Particularly, the invention relates to a projection apparatus and a light source adjusting method thereof.

2. Description of Related Art

A projection apparatus is a display apparatus used for producing large size images. An imaging principle of the projection apparatus is to convert an illumination beam generated by a light source into an image beam through a light valve, and then project the image beam onto a screen through a lens to form an image. With development of the projection technique and reduction of a fabrication cost, utilization of the projection apparatus is gradually developed from commercial use to domestic use.

In detail, when the projection apparatus functions, an optical path from the light source to an imaging device has to be correct such that a lighting area on the imaging device generated when a light beam is projected thereon is overlapped to the image device, and the image of the imaging device can be completely projected onto the screen through a lens module. If positioning of the light source has an error, problems of brightness reduction and poor imaging quality are encountered. Even if the light source is precisely positioned during assembling, a lampwick of a lamp bulb is still gradually deviated from an original center position as utilization time thereof increases, which results in a fact that a projected image is darkened. In a typical projection apparatus, there is no adjustment mechanism for an illumination system, and the light source is generally fixed in the optical engine, which is locked and fixed after assembling and cannot be adjusted, so that optical quality thereof cannot be optimised.

Taiwan Patent No. 1267606 discloses a mechanism of assembling a light source to a lamp base through screws and a spring. Taiwan Patent No. 579452 discloses a projection apparatus, in which a digital micro mirror device (DMD) can reflect light to a light sensor to control a light flux of the light source. Taiwan utility model patent No. 582494 discloses a device used for adjusting a projection angle and a focal length of a light source. Taiwan Publication No. 200702891 discloses a projection apparatus, in which electricity of a corresponding power is applied on a lamp bulb according to a utilization time corresponding to predetermined gain power data, so as to maintain the lamp bulb to a fixed brightness. U.S. Pat. No. 6,909,560 discloses an adjustment mechanism for a lens of a projection apparatus, by which the lens is adjusted through components such as a gear, a worm and a cam, etc.

SUMMARY OF THE INVENTION

The invention is directed to a projection apparatus, in which a position of a light source could be adjusted to maintain good brightness performance.

The invention is directed to a light source adjusting method, by which a position of a light source of a projection apparatus is adjusted to maintain good brightness performance.

Other objects and advantages of the invention may be further comprehended through the technical features disclosed in the invention.

In order to achieve one or part of or all the objectives or other objectives, an embodiment of the invention provides a projection apparatus including a digital micro mirror device (DMD), a light source, a lens, a photoelectric conversion device, a decision device, and an adjustment module. The DMD is suitable for being switched to a first operating state or a second operating state. The light source emits a light beam to the DMD. When the DMD is switched to the first operating state, the DMD reflects the light beam to the lens. When the DMD is switched to the second operating state, the DMD reflects the light beam to the photoelectric conversion device. The photoelectric conversion device generates a signal value according to a light intensity of the light beam emitted by the light source. The decision device is electrically connected to the photoelectric conversion device, and compares the signal value with a predetermined value. When the signal value is smaller than the predetermined value, the decision device generates a driving signal value. The adjustment module is electrically connected to the decision device and is coupled to the light source. The driving signal value is used for driving the adjustment module to sequentially adjust a position of the light source along a plurality of axes.

In order to achieve one or part of or all the objectives or other objectives, an embodiment of the invention provides a light source adjusting method, adapted to adjust a position of a light source of a projection apparatus. First, a digital micro mirror device (DMD) and a photoelectric conversion device are provided, where the DMD is suitable for being switched to a first operating state or a second operating state, and when the DMD is switched to the first operating state, the DMD reflects a light beam emitted by the light source to a lens, and when the DMD is switched to the second operating state, the DMD reflects the light beam to the photoelectric conversion device. Then, the DMD is switched to the second operating state. The photoelectric conversion device generates a signal value according to a light intensity of the light beam. A decision device compares the signal value with a predetermined value. When the signal value is smaller than the predetermined value, the decision device generates a driving signal value for driving an adjustment module to sequentially adjust a position of the light source along a plurality of axes.

According to the above descriptions, the DMD could reflect the light beam emitted by the light source to the photoelectric conversion device, and the photoelectric conversion device generates the signal value according to the light intensity of the light beam. In this way, the signal value and the predetermined value are compared to determine whether or not to drive the adjustment module to sequentially adjust a position of the light source along a plurality of axes, so as to maintain good brightness performance of the light source of the projection apparatus.

In the invention, the signal value generated by the photoelectric conversion device according to the light intensity of the light beam is, for example, a voltage or a current signal value, though the invention is not limited thereto, and other means that could be easily implemented by those skilled in the art could also be applied in the invention.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention could be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
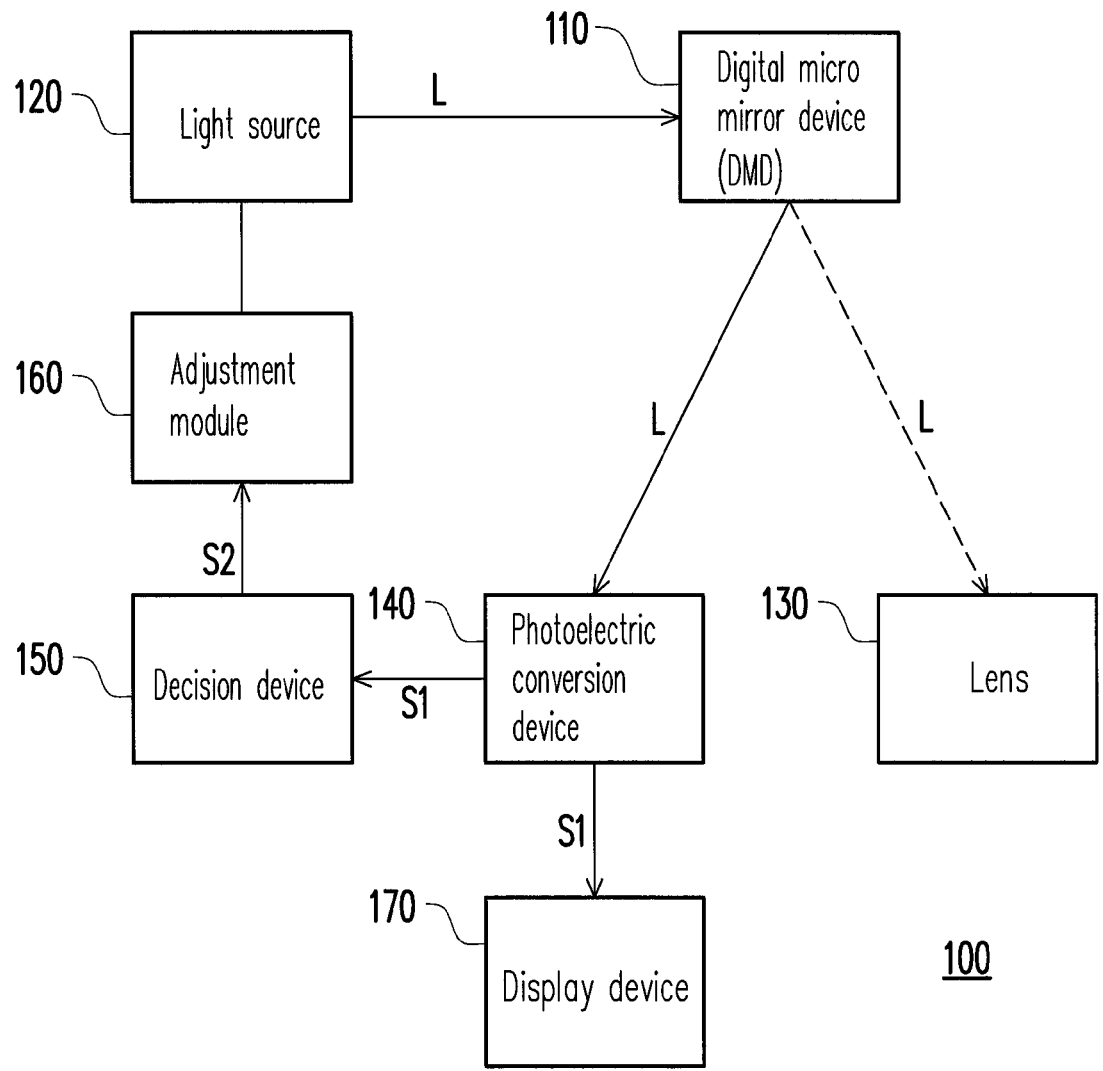
FIG. 1 is a block diagram of a projection apparatus according to an embodiment of the invention.
Figure 2:
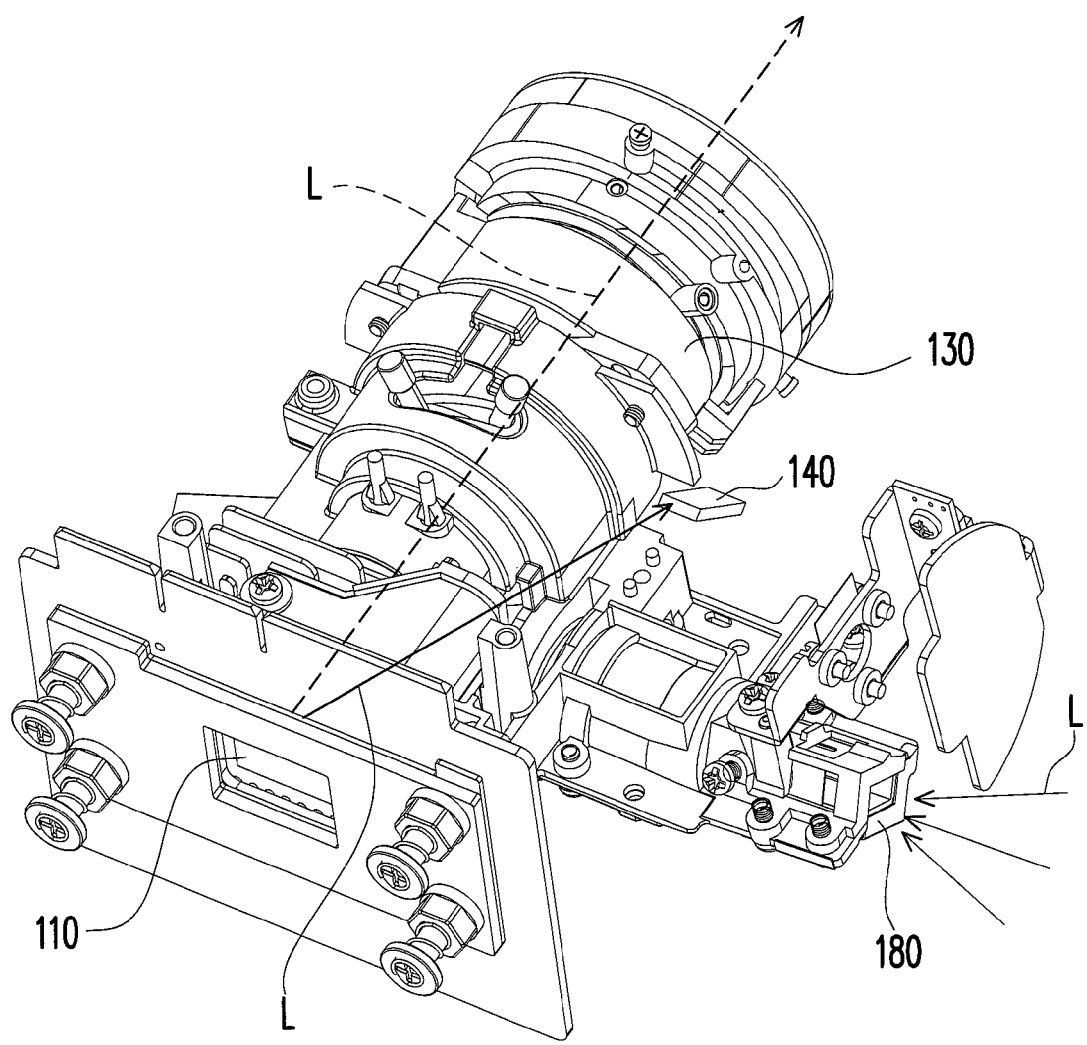
FIG. 2 is a three-dimensional view of a digital micro mirror device (DMD), a lens, and a photoelectric conversion device of FIG. 1.

FIG. 1 is a block diagram of a projection apparatus according to an embodiment of the invention. FIG. 2 is a three-dimensional view of a digital micro mirror device (DMD), a lens, and a photoelectric conversion device of FIG. 1. Referring to FIG. 1 and FIG. 2, the projection apparatus 100 of the embodiment includes a digital micro mirror device (DMD) 110, a light source 120, a lens 130, a photoelectric conversion device 140, a decision device 150, and an adjustment module 160. The light source 120 emits a light beam L to the DMD 110, and the DMD 110 is suitable for being switched to a first operating state or a second operating state. The first operating state is, for example, a projection state, and the second operating state is, for example, a light source adjusting state. When the projection apparatus 100 executes a projection function, the DMD 110 is in the first operating state and reflects the light beam L to the lens 130 for projection. When a user wants to adjust the light source 120, the DMD 110 is switched to the second operating state.

When the DMD 110 is switched to the second operating state, the DMD 110 reflects the light beam L to the photoelectric conversion device 140. Then, the photoelectric conversion device 140 generates a voltage signal value S1 according to a light intensity of the light beam L. The decision device 150 is electrically connected to the photoelectric conversion device 140, and compares the voltage signal value S1 with a predetermined value. When the voltage signal value S1 is smaller than the predetermined value, the decision device 150 generates a driving signal value S2. The adjustment module 160 is electrically connected to the decision device 150 and is coupled to the light source 120. The driving signal value S2 is used for driving the adjustment module 160 to sequentially adjust a position of the light source 120 along a plurality of axes. The user can define a suitable predetermined value according to a type of the light source 120, which is not limited by the invention. Moreover, in the invention, the signal value generated by the photoelectric conversion device 140 according to the light intensity of the light beam L is, for example, a voltage or a current signal value, though the invention is not limited thereto.

According to the above configuration, the DMD 110 reflects the light beam L emitted by the light source 120 to the photoelectric conversion device 140, and the photoelectric conversion device 140 generates the voltage signal value S1 according to the light intensity of the light beam L. In this way, the voltage signal value S1 and the predetermined value are compared to determine whether or not to drive the adjustment module 160 to sequentially adjust the position of the light source 120 along a plurality of axes, so as to maintain good brightness performance of the light source 120 of the projection apparatus 100.

Figure 3:
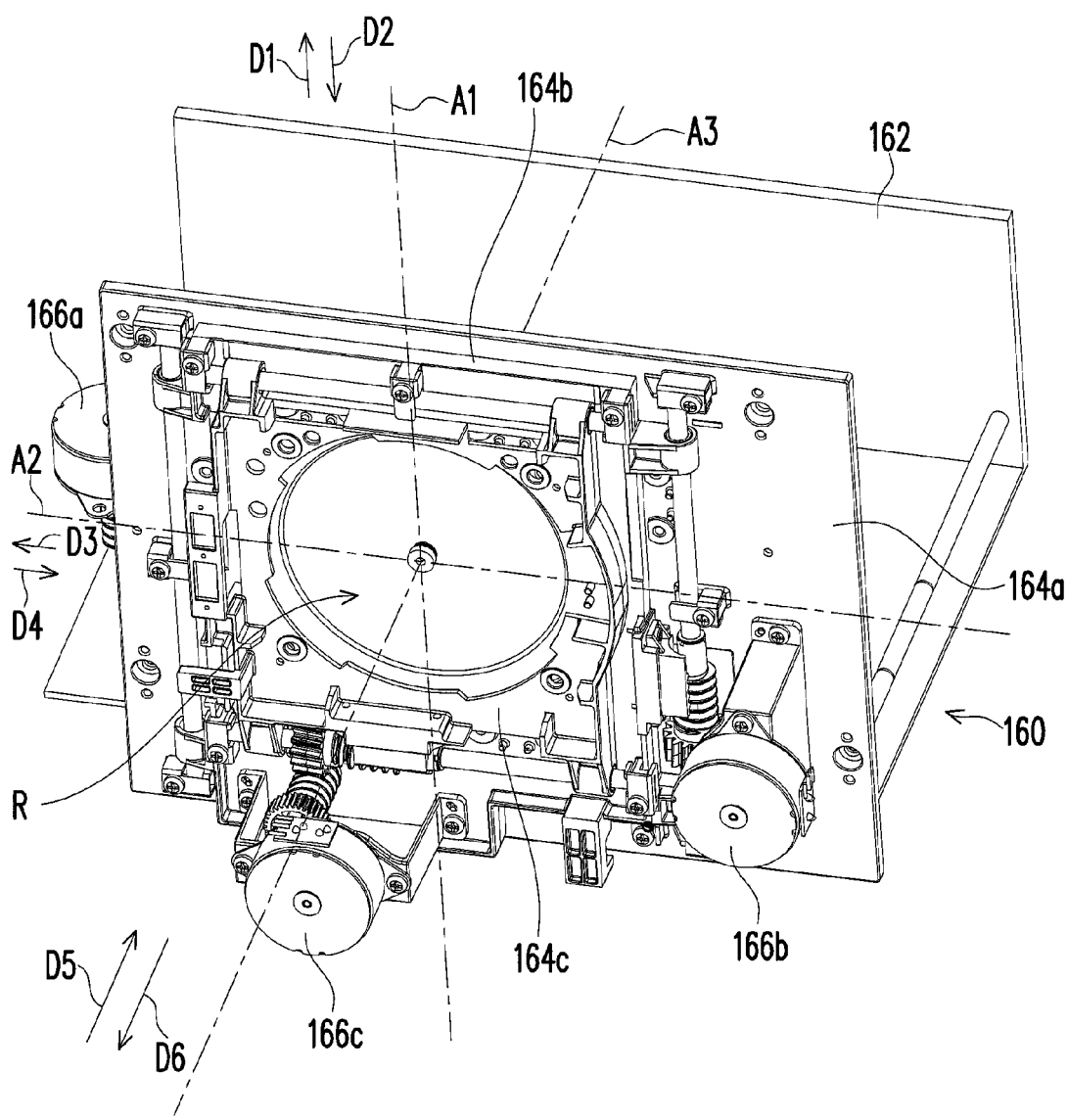
FIG. 3 is a three-dimensional view of an adjustment module of FIG. 1.

FIG. 3 is a three-dimensional view of the adjustment module of FIG. 1. Referring to FIG. 3, the aforementioned axes include a first axis A1, a second axis A2, and a third axis A3. The first axis A1 is perpendicular to the second axis A2, and the third axis A3 is perpendicular to the first axis A1 and the second axis A2, and the adjustment module 160 adjusts the position of the light source 120 (shown in FIG. 1) along the first axis A1, the second axis A2 and the third axis A3. In detail, the adjustment module 160 includes a base 162, a first frame 164a, a second frame 164b, a third frame 164c, a first actuator 166a, a second actuator 166b and a third actuator 166c, where the position of the light source 120 could be adjusted through operations of the above components, which is described in detail below.

The first frame 164a is movably connected to the base 162 along the third axis A3, the second frame 164b is movably connected to the first frame 164a along the first axis A1, and the third frame 164c is movably connected to the second frame 164b along the second axis A2, and the light source 120 is fixed on the third frame 164c. For clarity's sake, the light source 120 is not illustrated in FIG. 3, and the light source 120 is, for example, fixed to a region R of the third frame 164c of FIG. 3. The first actuator 166a is coupled to the first frame 164a, and the driving signal value S2 (shown in FIG. 1) is used for driving the first actuator 166a to operate, so as to drive the first frame 164a to move relative to the base 162 along the third axis A3, by which the position of the light source 120 on the third axis A3 is adjusted. The second actuator 166b is coupled to the second frame 164b, and the driving signal value S2 is used for driving the second actuator 166b to operate, so as to drive the second frame 164b to move relative to the first frame 164a along the first axis A1, by which the position of the light source 120 on the first axis A1 is adjusted. The third actuator 166c is coupled to the third frame 164c, and the driving signal value S2 is used for driving the third actuator 166c to operate, so as to drive the third frame 164c to move relative to the second frame 164b along the second axis A2, by which the position of the light source 120 on the second axis A2 is adjusted.

In the embodiment, the first actuator 166a, the second actuator 166b, and the third actuator 166c are, for example, motors, which drive the first frame 164a, the second frame 164b and the third frame 164c through components such as gears and worms, etc., though the invention is not limited thereto, and the first actuator 166a, the second actuator 166b and the third actuator 166c could be other suitable types of actuators, which could drive the first frame 164a, the second frame 164b, and the third frame 164c through other suitable manners.

In the embodiment, an operation sequence of the first actuator 166a, the second actuator 166b and the third actuator 166c could be determined according to sensitivities of the light intensity of the light beam emitted by the light source 120 relative to the first axis A1, the second axis A2 and the third axis A3. For example, if the light source 120 moves a same distance along the first axis A1, the second axis A2 and the third axis A3, the voltage signal value S1 (shown in FIG. 1) may have a first voltage signal value variation (i.e. a variation between the voltage signal value corresponding to an original position and the voltage signal value corresponding to a position after movement), a second voltage signal value variation and a third voltage signal value variation, and the first voltage signal value variation is greater than the second voltage signal value variation, and the second voltage signal value variation is greater than the third voltage signal value variation, the driving signal value S2 (shown in FIG. 1) then first drives the second actuator 166b to adjust the position of the light source 120 along the first axis A1, and then drives the third actuator 166c to adjust the position of the light source 120 along the second axis A2, and finally drives the first actuator 166a to adjust the position of the light source 120 along the third axis A3.

Figure 4:
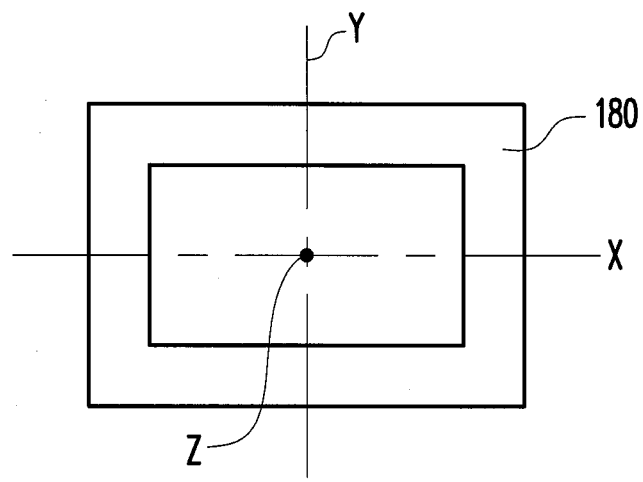
FIG. 4 is a front view of a light integrator of FIG. 2.
Figure 5:
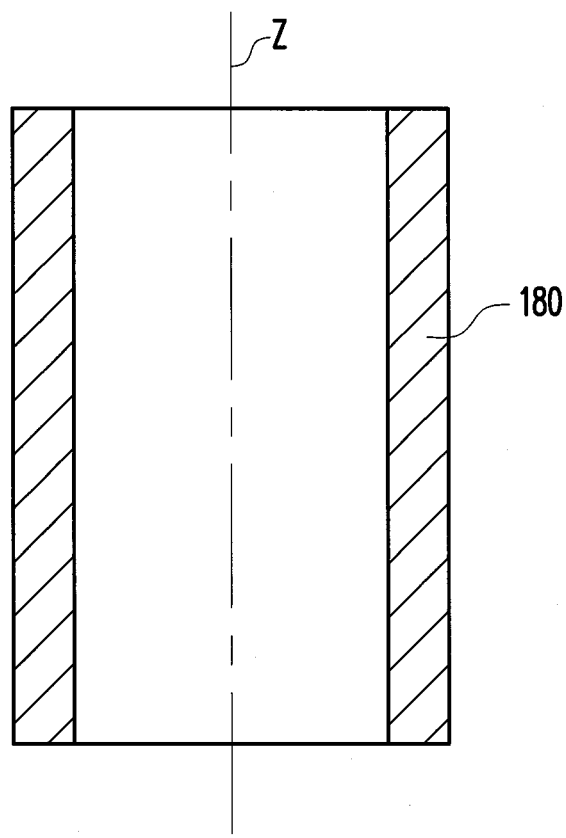
FIG. 5 is a cross-sectional view of the light integrator of FIG. 2.

In other words, according to the aforementioned driving method, adjustment along the axis (the first axis A1) that most significantly influences the light intensity of the light source 120 is first performed, and then adjustments along the axes (the second axis A2 and the third axis A3) that less significantly influence the light intensity of the light source 120 are performed, so as to improve adjustment efficiency. FIG. 4 is a front view of a light integrator of FIG. 2. FIG. 5 is a cross-sectional view of the light integrator of FIG. 2. Referring to FIG. 2 to FIG. 5, in the embodiment, to match a size of the DMD 110, sizes of the light integrator 180 of the projection apparatus 100 along a long axis X and a short axis Y are different. The first axis A1 that most significantly influences the light intensity of the light source 120 could correspond to the short axis Y of the light integrator 180, the second axis A2 could correspond to the long axis X of the light integrator 180, and the third axis A3 that least significantly influences the light intensity of the light source 120 could correspond to a central axis Z of the light integrator 180, though the invention is not limited thereto. The operations of sequentially adjusting the position of the light source 120 along the first axis A1, the second axis A2 and the third axis A3 are equivalent to operations of sequentially adjusting the position of the light source 120 along the short axis Y, the long axis X and the central axis Z of the light integrator 180.

The light source 120 of the embodiment is, for example, a high-voltage mercury lamp, though the invention is not limited thereto, and in other embodiments, the light source could be other suitable light emitting devices. In the embodiment, the photoelectric conversion device 140 is, for example, a photo-sensitive resistor, a photo diode or a photo-transistor, though the invention is not limited thereto, and in other embodiments, other suitable photoelectric conversion devices could also be applied. Moreover, as shown in FIG. 1, the projection apparatus 100 further includes a display device 170. The display device 170 is electrically connected to the photoelectric conversion device 140, and displays a brightness value of the light source 120 according to the voltage signal value S1 to facilitate the user being aware of the current brightness performance of the light source 120.

Figure 6:
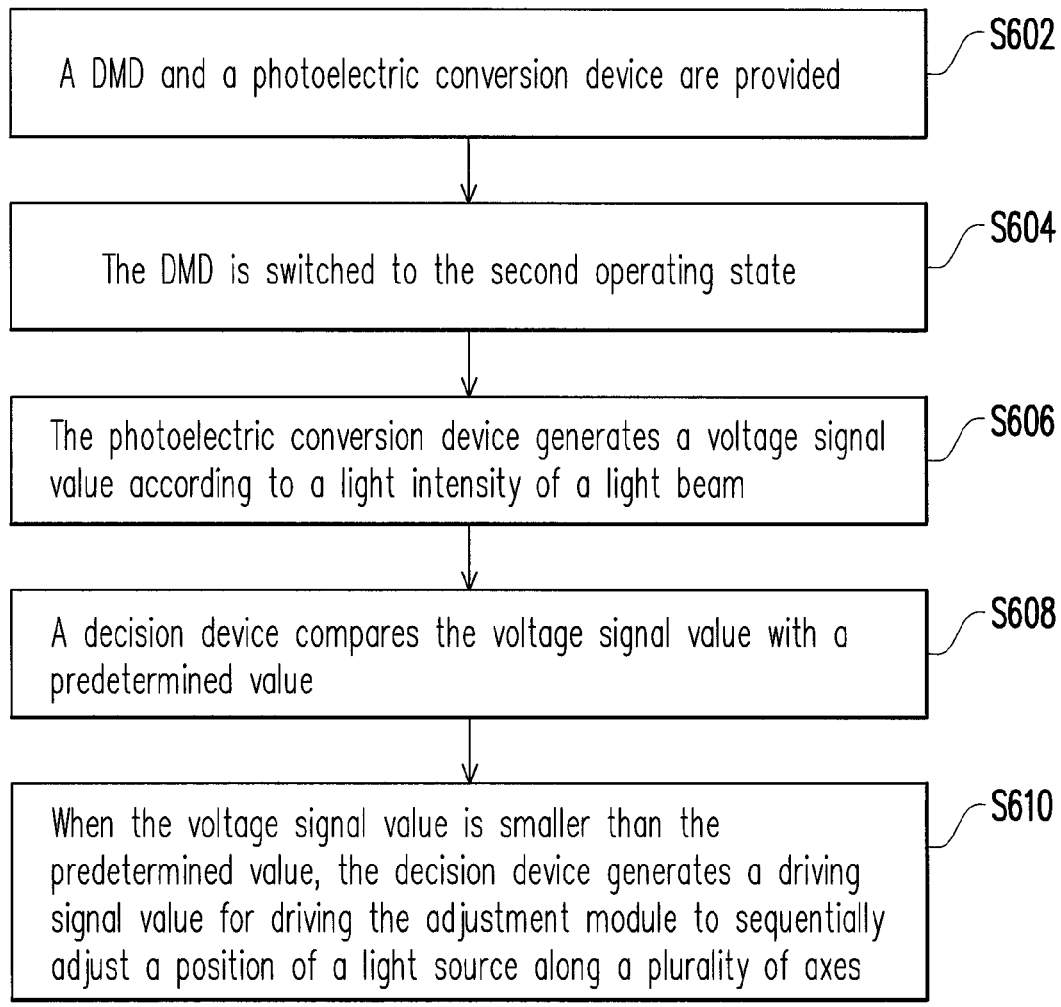
FIG. 6 is a flowchart illustrating a light source adjusting method of the projection apparatus of FIG. 1.

A light source adjusting method of the invention is described below with reference of the projection apparatus 100 of FIG. 1. FIG. 6 is a flowchart illustrating a light source adjusting method of the projection apparatus of FIG. 1. Referring to FIG. 1 and FIG. 6, first, the DMD 110 and the photoelectric conversion device 140 are provided (step S602), where the DMD 110 is suitable for being switched to the first operating state or the second operating state, and when the DMD 110 is switched to the first operating state, the DMD 110 reflects the light beam L emitted by the light source 120 to the lens 130, and when the DMD 110 is switched to the second operating state, the DMD 110 reflects the light beam L to the photoelectric conversion device 140. Then, the DMD 110 is switched to the second operating state (step S604). The photoelectric conversion device 140 generates the voltage signal value S1 according to a light intensity of the light beam L (step S606). The decision device 150 compares the voltage signal value S1 with the predetermined value (step S608). When the voltage signal value S1 is smaller than the predetermined value, the decision device 150 generates the driving signal value S2 for driving the adjustment module 160 to sequentially adjust a position of the light source 120 along a plurality of axes (step S610).

Referring to FIG. 3, as described above, the operation sequence of the first actuator 166a, the second actuator 166b and the third actuator 166c is determined according to sensitivities of the light intensity of the light beam emitted by the light source 120 relative to the first axis A1, the second axis A2 and the third axis A3, and adjustment along the axis that most significantly influences the light intensity of the light source 120 is first performed, and then adjustments along the axes that less significantly influence the light intensity of the light source 120 are performed, so as to improve the adjustment efficiency. A method for comparing sensitivities of the light intensity of the light source 120 relative to the first axis A1, the second axis A2 and the third axis A3 is, for example, to drive the light source 120 to respectively move the same distance along the first axis A1, the second axis A2 and the third axis A3, and respectively measure variations of the voltage signal value S1 to obtain the first voltage signal value variation, the second voltage signal value variation and the third voltage signal value variation corresponding to the first axis A1, the second axis A2 and the third axis A3. Then, the first voltage signal value variation, the second voltage signal value variation and the third voltage signal value variation are compared to compare the sensitivities of the light intensity of the light source 120 relative to the first axis A1, the second axis A2 and the third axis A3.

For example, when the first voltage signal value variation is greater than the second voltage signal value variation and the second voltage signal value variation is greater than the third voltage signal value variation, it represents that the axis that most significantly influences the light intensity of the light source 120 is the first axis A1, the axis that less significantly influences the light intensity of the light source 120 is the second axis A2, and the axis that least significantly influences the light intensity of the light source 120 is the third axis A3. Therefore, the position of the light source 120 is sequentially adjusted along the first axis A1, the second axis A2 and the third axis A3, and an operation flow of the adjustment module 160 is described in detail below.

Figure 7:
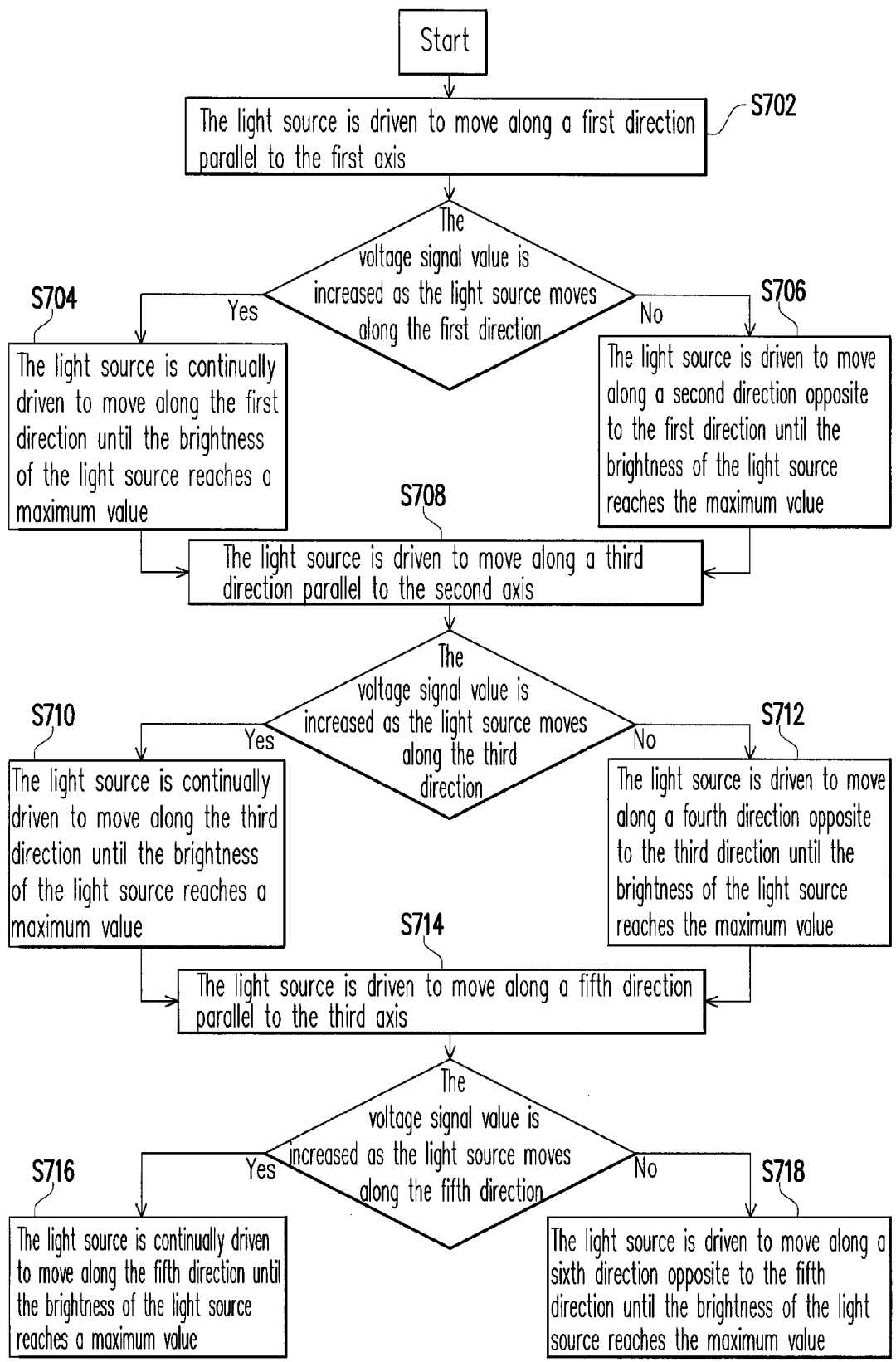
FIG. 7 is an operation flowchart of the adjustment module of FIG. 3.

FIG. 7 is an operation flowchart of the adjustment module of FIG. 3. Referring to FIG. 1, FIG. 3 and FIG. 7, first, the light source 120 is driven to move along a first direction D1 parallel to the first axis A1 (step S702). If the voltage signal value S1 is increased as the light source 120 moves along the first direction D1, the light source 120 is continually driven to move along the first direction D1, and until the brightness of the light source 120 reaches a maximum value (step S704), adjustment of the light source 120 along the first axis A1 is completed. If the voltage signal value S1 is not increased as the light source 120 moves along the first direction D1, the light source 120 is driven to move along a second direction D2 opposite to the first direction D1, and until the brightness of the light source 120 reaches the maximum value (step S706), adjustment of the light source 120 along the first axis A1 is completed. If the second actuator 166b is a motor, the light source 120 could be driven to move along the first direction D1 or the second direction D2 through forward rotation or backward rotation of the motor.

Then, the light source 120 is driven to move along a third direction D3 parallel to the second axis A2 (step S708). If the voltage signal value S1 is increased as the light source 120 moves along the third direction D3, the light source 120 is continually driven to move along the third direction D3, and until the brightness of the light source 120 reaches a maximum value (step S710), adjustment of the light source 120 along the second axis A2 is completed. If the voltage signal value S1 is not increased as the light source 120 moves along the third direction D3, the light source 120 is driven to move along a fourth direction D4 opposite to the third direction D3, and until the brightness of the light source 120 reaches the maximum value (step S712), adjustment of the light source 120 along the second axis A2 is completed. If the third actuator 166c is a motor, the light source 120 could be driven to move along the third direction D3 or the fourth direction D4 through forward rotation or backward rotation of the motor.

Finally, the light source 120 is driven to move along a fifth direction D5 parallel to the third axis A3 (step S714). If the voltage signal value S1 is increased as the light source 120 moves along the fifth direction D5, the light source 120 is continually driven to move along the fifth direction D5, and until the brightness of the light source 120 reaches a maximum value (step S716), adjustment of the light source 120 along the third axis A3 is completed. If the voltage signal value S1 is not increased as the light source 120 moves along the fifth direction D5, the light source 120 is driven to move along a sixth direction D6 opposite to the fifth direction D5, and until the brightness of the light source 120 reaches the maximum value (step S718), adjustment of the light source 120 along the third axis A3 is completed. If the first actuator 166a is a motor, the light source 120 could be driven to move along the fifth direction D5 or the sixth direction D6 through forward rotation or backward rotation of the motor. Now, adjustments along all of the axes are completed, and if the voltage signal value S1 is greater than or equal to the predetermined value, it represents that the light source 120 has achieved the good brightness performance through adjustment of the adjustment module 160, and if the voltage signal value S1 is still smaller than the predetermined value, the user may select to replace the light source 120.

In summary, the DMD could reflect the light beam emitted by the light source to the photoelectric conversion device, and the photoelectric conversion device generates the voltage signal value according to the light intensity of the light beam. In this way, the voltage signal value and the predetermined value are compared to determine whether or not to drive the adjustment module to sequentially adjust a position of the light source along a plurality of axes, so as to maintain good brightness performance of the light source of the projection apparatus. Moreover, adjustment along the axis that most significantly influences the light intensity of the light source is first performed, and then adjustments along the axes that less significantly influence the light intensity of the light source are performed, so as to improve adjustment efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
    a digital micro mirror device (DMD), suitable for being switched to a first operating state or a second operating state;
    a light source, emitting a light beam to the DMD;
    a lens, wherein when the DMD is switched to the first operating state, the DMD reflects the light beam to the lens;
    a photoelectric conversion device, wherein when the DMD is switched to the second operating state, the DMD reflects the light beam to the photoelectric conversion device, and the photoelectric conversion device generates a signal value according to a light intensity of the light beam;
    a decision device, electrically connected to the photoelectric conversion device, and comparing the signal value with a predetermined value, wherein when the signal value is smaller than the predetermined value, the decision device generates a driving signal value; and
    an adjustment module, electrically connected to the decision device and coupled to the light source, wherein the driving signal value is used for driving the adjustment module to sequentially adjust a position of the light source along a plurality of axes.

2. The projection apparatus as claimed in claim 1, wherein the axes comprise a first axis, a second axis and a third axis, the first axis is perpendicular to the second axis, and the third axis is perpendicular to the first axis and the second axis.

3. The projection apparatus as claimed in claim 2, wherein the light source moves a distance along the first axis to cause the signal value to generate a first signal value variation, the light source moves the distance along the second axis to cause the signal value to generate a second signal value variation, and the light source, moves the distance along the third axis to cause the signal value to generate a third signal value variation, wherein when the first signal value variation is greater than the second signal value variation, and the second signal value variation is greater than the third signal value variation, the driving signal value drives the adjustment module to sequentially adjust the position of the light source along the first axis, the second axis and the third axis.

4. The projection apparatus as claimed in claim 2, wherein the adjustment module comprises:
    a base;
    a first frame, movably connected to the base along the third axis;
    a first actuator, coupled to the first frame, wherein the driving signal value is used for driving the first actuator to operate, so as to drive the first frame to move relative to the base along the third axis;
    a second frame, movably connected to the first frame along the first axis;
    a second actuator, coupled to the second frame, wherein the driving signal value is used for driving the second actuator to operate, so as to drive the second frame to move relative to the first frame along the first axis;
    a third frame, movably connected to the second frame along the second axis, wherein the light source is fixed on the third frame; and
    a third actuator, coupled to the third frame, wherein the driving signal value is used for driving the third actuator to operate, so as to drive the third frame to move relative to the second frame along the second axis.

5. The projection apparatus as claimed in claim 1, further comprising a display device, wherein the display device is electrically connected to the photoelectric conversion device, and displays a brightness value of the light source according to the signal value.

6. The projection apparatus as claimed in claim 1, wherein the light source is a high-voltage mercury lamp.

7. The projection apparatus as claimed in claim 1, wherein the photoelectric conversion device is a photo-sensitive resistor, a photo diode or a photo-transistor.

8. A light source adjusting method, adapted to adjust a position of a light source of a projection apparatus, the light source adjusting method comprising:
    providing a digital micro mirror device (DMD) and a photoelectric conversion device, wherein the DMD is suitable for being switched to a first operating state or a second operating state, and when the DMD is switched to the first operating state, the DMD reflects a light beam emitted by the light source to a lens, and when the DMD is switched to the second operating state, the DMD reflects the light beam to the photoelectric conversion device;
    switching the DMD to the second operating state;
    generating a signal value by the photoelectric conversion device according to a light intensity of the light beam;
    comparing the signal value with a predetermined value by a decision device; and
    generating a driving signal value by the decision device for driving an adjustment module to sequentially adjust a position of the light source along a plurality of axes when the signal value is smaller than the predetermined value.

9. The light source adjusting method as claimed in claim 8, wherein the axes comprise a first axis, a second axis and a third axis, the first axis is perpendicular to the second axis, and the third axis is perpendicular to the first axis and the second axis.

10. The light source adjusting method as claimed in claim 9, wherein the step of driving the adjustment module to sequentially adjust the position of the light source along the axes comprises:
    driving the light source to move a distance along the first axis, and measuring a variation of the signal value to obtain a first signal value variation;
    driving the light source to move the distance along the second axis, and measuring a variation of the signal value to obtain a second signal value variation;
    driving the light source to move the distance along the third axis, and measuring a variation of the signal value to obtain a third signal value variation; and
    comparing the first signal value variation, the second signal value variation and the third signal value variation, wherein when the first signal value variation is greater than the second signal value variation, and the second signal value variation is greater than the third signal value variation, the position of the light source is sequentially adjusted along the first axis, the second axis and the third axis.

11. The light source adjusting method as claimed in claim 8, wherein the step of adjusting the position of the light source along one of the axes comprises:
    driving the light source to move along a first direction parallel to the axis;

continually driving the light source to move along the first direction when the signal value increases as the light source moves along the first direction; and driving the light source to move along a second direction opposite to the first direction when the signal value decreases as the light source moves along the first direction.

* * * * *